United States Patent Office

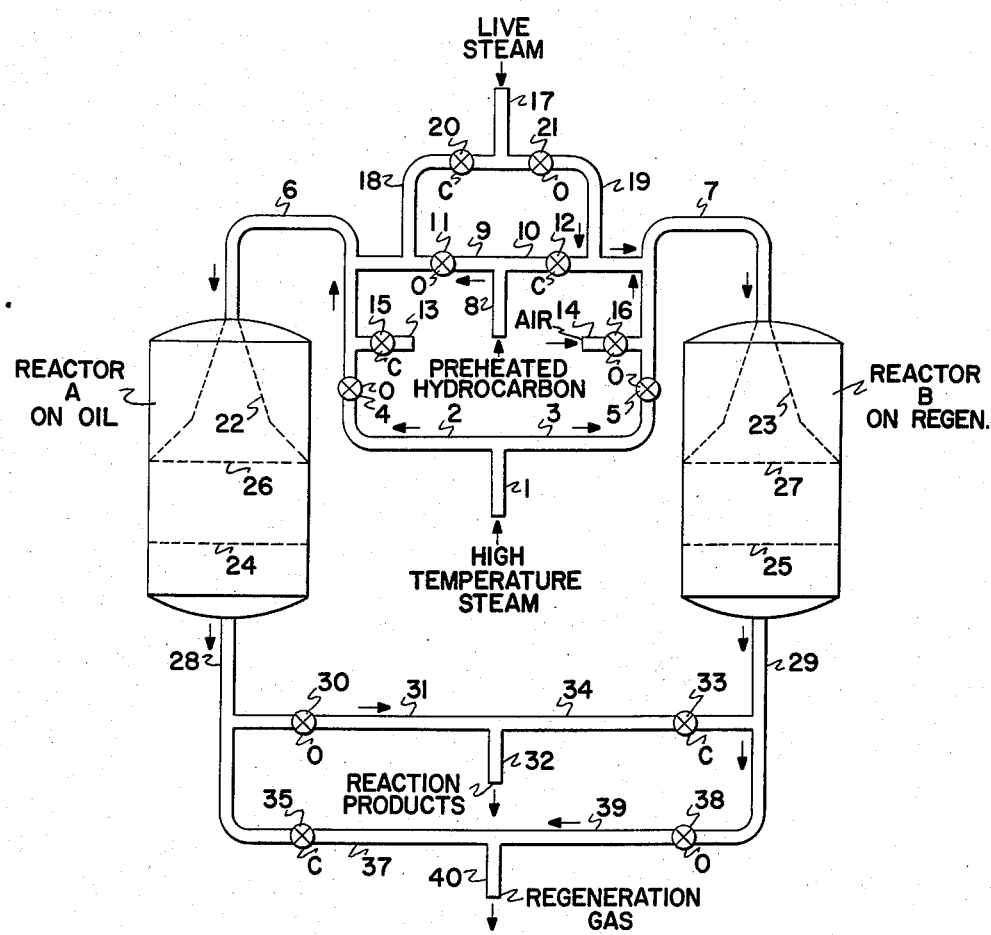

2,924,632
Patented Feb. 9, 1960

2,924,632

PROCESS FOR CONTROLLED SUPPLY OF STEAM TO CATALYSTS

George P. Baumann, Edison, N.J., assignor to Esso Research and Engineering Company, a corporation of Delaware Application March 6, 1957, Serial No. 644,339

5 Claims. (Cl. 260—680)

This invention relates to a method and means for supplying steam at high temperatures above reaction temperatures to catalyst beds which are periodically on-stream for reaction of carbonaceous materials and periodically regenerated to remove carbonaceous deposits. More particularly, it is concerned with controlling pressures and amounts of steam supplied during all stages of a cyclic operation, which involves stages of reaction, purging, and regeneration to maintain nearly constant pressures and to eliminate a depressuring (pressure lowering) step which was required conventionally between the stages of regeneration and reaction.

A number of processes have been developed for catalytic reactions of hydrocarbons and other organic compounds at elevated temperatures in the presence of large proportions of steam. In such processes, the catalyst becomes deactivated by carbonaceous deposits from the carbonaceous materials undergoing reaction, e.g. cracking, dehydrogenation, and isomerization. The catalysts become impaired or lose their activity during the reaction and have to be periodically regenerated by burning the carbonaceous deposits.

Typical reactions in which carbonaceous materials, such as monoolefins or aryl alkenes, are dehydrogenated in the presence of large proportions of steam use catalysts like magnesia-iron oxide, magnesia chromia, chromia-alumina, zinc oxide, iron oxide, calcium-nickel phosphate and other combinations of such metal oxides, metals, and other compounds of metals. The catalysts selected are preferably of a kind not inhibited by large proportions of steam advantageously used to make the partial pressure of the organic reactant in the reaction mixture relatively low and to thereby obtain a high selectivity in the reaction.

Other processes of this type include dehydrogenation of paraffins to form olefins and diolefins, cracking of hydrocarbons, isomerization of hydrocarbons and direct hydration of organic compounds. It will be appreciated that still other processes with various organic reactants and known catalysts are comprehended as involving the problems solved by the present invention.

Generally, the reaction vessels or reactors used are made to contain beds of desired solid catalyst particles and are designed to operate in pairs so that during a period when one reactor is on-stream for reaction another reactor is in a part of the cycle for regeneration of the catalyst. Usually, the reactors are provided with equipment for switching them automatically through each stage of the cycle so as to maintain continuous production with continuous flow of feed streams. In these operations, it is important to maintain continuous flow of materials at controlled flow rates, and further to prevent wide changes in pressures. A type of process in which the present invention makes an improvement is described in U.S. Patent 2,509,900 of D. J. Wormith, patented May 30, 1950, in which direct control of high temperature steam was not used because of several difficulties including metering, high temperature valve operation and control, and drastic pressure changes between stages of the cycle.

Without use of proper means for throttling high temperature steam fed to the reactor, there is a considerable difference between the pressure in the reactor on-stream for reaction and the reactor in which regeneration is being carried out. For example during the reaction, the high temperature steam makes the reaction zone pressure 10 lbs. per square inch gauge (p.s.i.g.) and at the same time builds up pressure in the reactor on-regeneration up to 45 p.s.i.g. Then, in order to minimize mechanical destruction of the catalyst pellets or pills when switching from regeneration to reaction, it is necessary to interpose a depressuring step so as to lower the pressure gradually from the high regeneration pressure to the desired reaction pressure.

Using the method of the present invention, total steam supplied to both reactors is controlled through flow controllers, and the high temperature steam is divided between the reactors by use of steam throttle valves. These valves are preferably similar to variable orifice valves which operate in the manner of known slide valves or gate valves which permit the high temperature steam to flow at all times but at more or less restricted rates depending on the orifice area. With the use of such throttling valves, the pressure in the reactor on regeneration can be kept about the same as the pressure in the reactor on reaction, thereby eliminating the depressurizing step. By eliminating the need for depressuring, the time required for switching a reactor from a regeneration to a reaction stage is reduced and the cycle time is shortened. With a shorter cycle time the catalyst is maintained at a higher activity level to give increased production.

For the general application of the present invention, a preheated or vaporized organic feed to be converted is admixed with a stream of superheated and relatively higher temperature steam which gives the resulting mixture the desired elevated temperature for the catalytic reaction. The mixture at the desired reaction temperature is brought into contact with a bed of catalyst which catalyzes the reaction. Preferably the mixture of the high temperature steam and organic reactant is expanded during its travel from a mixing zone to the place where the mixture contacts the catalyst in order to reduce the linear flow velocity. In this expansion of the mixture, a pressure drop of 8 to 2 pounds per square inch may occur. The effluent products which pass through the catalyst bed are then withdrawn from the reactor, being cooled soon after they leave the catalyst as by an injected quench material and/or heat exchange in a waste heat boiler. When the catalyst used in the reaction needs regeneration, the organic feed stream is shut off, the reaction zone is then purged with steam of the mixture containing the organic reactant after which air is admitted with the steam to the reactor for the regeneration period or stage to accomplish oxidation of carbonaceous deposits on the catalyst. In the regeneration stage, there tends to be a buildup of pressure unless suitable controls are made on feed gases and the effluent regeneration gas.

The invention will be described more particularly with reference to the accompanying drawing which shows diagrammatically a flow plan of a double reactor unit, its feed controls and regeneration facilities.

Referring to the drawing, a pair of reactors A and B are coupled to common feed lines and effluent lines. High temperature steam continuously flows through line 1 then through the interconnecting branches 2 and 3 to reactors A and B respectively. The high temperature steam passes through throttling valves 4 and 5 to the feed inlet mixing conduits 6 and 7. The organic feed preheated and vaporized comes from a main feed line 8 to flow through either of the branches 9 or 10 into either reactor A or reactor B depending on which reaction vessel is on-stream for reaction. When reactor A is on-stream for reaction, valve 11 in branch 9 is open and valve 12 in branch 10 is closed. Valves opened are indicated by O. Valves closed are indicated by C.

Air is supplied through lines 13 and 14 to either reactor on regeneration. When reactor A is on-oil, valve 15 in air inlet 13 is closed. Valve 16 in line 14 is open when reactor B is on regeneration. Low temperature or live steam (300° to 500° F.) is supplied from line 17 to the header having branches 18 and 19. When reactor A is on-oil valve 20 is closed. Valve 21 in branch 19 is open when the reactor B is being purged of reaction products before the regeneration and is being purged of air following regeneration.

The reactors may be provided with diffusion or expansion cones 22 and 23 for expanding the gaseous mixtures directed toward the top of the catalyst beds to slow up the linear velocity of the gases. The catalyst beds are located in an intermediate part of the reaction vessels supported on grids 24 and 25. Screens or gratings 26 and 27 may be placed above the catalyst beds to help keep the catalyst in place. Each reactor has an outlet line 28 and 29 leading to headers for removal of effluent. When reactant A is on-oil, the effluent product flows through open valve 30 into the header branch 31 and out through the main product line 32, valve 33 in header branch 34 being closed; also valve 35 in regeneration gas header branch 37 being closed. Reactor B on purge and on regeneration will have valve 38 in header branch 39 open so that the gas from reactor B can be withdrawn through the main regeneration gas outlet 40, valve 35 in branch 37 being closed.

The reactors are switched as rapidly as possible through the sequence of stages and this is done preferably with automatic control of the valves described. The duration of a stage can be controlled by a timer. Various adjustments can be made depending on the kind of reactant treated, the catalyst, size of equipment, and other conditions of operation. However, a suitable sequence of operations is tabulated as follows:

OPERATION SEQUENCE (1) *Reactor A on-oil.*—Superheated steam at 1200° to 1400° F. is diverted from line 1 mainly through branch 2 and control valve 4 to reactor A with valve 5 in branch 3 throttled; organic reactant vapor is passed through open valve 11 for mixing with the steam; valve 30 is opened; and valve 35 is closed to withdraw reaction products from reactor A.

Reactor B is on-regeneration with air inlet valve 16 open, reactant inlet valve 12 closed; valve 33 closed; and valve 38 open for removal of regeneration gas.

After regeneration of reactor B, air valve 16 in branch 14 is closed and live steam inlet valve 21 is opened. Valve 38 is closed and valve 33 is opened.

(2) *Reactor A on reaction product purge.*—Reactant inlet valve 11 is closed and valve 12 is opened; valve 4 is throttled; and live steam inlet valve 20 is open. Valve 5 is opened to divert a major portion of the high temperature steam to reactor B being put on-stream for reaction. After purging, valve 30 is closed, and valve 35 opened. Reactor B is on-stream for reaction.

(3) *Reactor A on-regeneration.*—Air inlet valve 15 is opened, and live steam valve 20 is closed.

Reactor B is on-stream for reaction.

(4) *Reactor A purged of regeneration gas.*—Air inlet valve 15 is closed; live steam valve 20 is opened; and valve 35 is open.

Reactor B is on reaction.

(5) *Reactor A returned to on-stream for reaction.*—Valve 35 is closed; valve 30 is opened, valve 4 is activated to a wider opening while valve 5 is throttled. Valve 11 is opened to admit reactant and valve 20 is closed.

Simultaneously, reactor B is being put in the reaction product purge, then on regeneration.

The sequence of steps should follow one another as rapidly as possible, but the time of purging and the time the reactor is on-oil is controlled by an adjustable timer. The purge time may be, for example, between 15 to 120 seconds. As the regeneration gas is removed from one of the reactors by opening the regeneration gas effluent valve for the reactor, adjustments can be made for increasing steam flow into the reactor to prevent back flow. Similarly, the opening of the regeneration header valves can be activated to open with buildup in the reactor from which the gas is being withdrawn by the use of differential pressure switches.

Now the operations will be described with reference to an example on catalytic dehydrogenation of butene.

Example

In the reaction, a mixture of butene vapors preheated to a maximum temperature at 1125° F. at 25 p.s.i.g. are injected into the mixer inlet of the reaction vessel on-oil. Superheated steam at 1400° F. and 40 p.s.i.g. is controlled by throttle valve and is mixed with the preheated butene vapors in a ratio of approximately 20 moles of steam per mole of butene. The steam-butene mixture having a temperature of 1025° to 1350° F. and a pressure of 20 p.s.i.g. is made to flow downwardly toward the catalyst bed with expansion and the gaseous products pass through the catalyst bed at a pressure in the range of 14 to 6 p.s.i.g. The feed inlet temperatures are controlled by adjusting heating temperatures; also, by admixing of tempering or live steam, e.g. 125 p.s.i.g. steam at 350° F.

The reaction product effluent containing steam, butadiene and unreacted butene from the on-oil reactor is withdrawn through the product header, then is cooled to about 500° F. by being passed through a heat exchanger or waste heat boiler, then passed into a quench tower for further cooling by intimate contact with quench oil and subsequently with water.

Using a highly active catalyst, such as one containing chromium oxide promoted calcium-nickel phosphate described in U.S. 2,442,320, a normal butene feed undergoes a conversion on an average of 40% with selectivity of 88% to butadiene using a space velocity of 120 volumes of reactant per hour per volume of catalyst based on the volume of n-butene under standard conditions.

Substantially improved results have been obtained by maintaining the catalyst at a higher level of activity with more frequent regeneration. Reduction of the cycle time greatly enhances the conversion as the effect of feed impurities on the catalyst are minimized. Moreover, benefits have been obtained by carrying out the operations at a lower pressure during the regeneration stage. For example, with conventional processes hitherto used in which the regeneration has been carried out under substantially higher pressures than those used in the reactor on-oil in which the depressuring (pressure lowering) step was employed for a comparative reaction, the total cycle time required was 90 minutes which included a longer period for regeneration. By the use of the principles of the present invention the cycle time is lowered to 30 minutes. The cycle time of 30 minutes allows 4 minutes for the purging and valve switching, 15 minutes for on-oil reaction and 11 minutes for the regeneration period.

The purging of the organic reactant vapor from the reactor by steam, both high temperature and live steam, with the organic reactant cut out may be allowed to take from 15 to 120 seconds but 60 seconds has been found sufficient.

Using catalysts such as potassium promoted iron oxide catalysts described in U.S. 2,395,876 and U.S. 2,426,829 similar benefits of the present invention are derived from the method of the present invention in maintaining uniformly low pressures through the cycle and eliminating a depressuring step even though little or no air is added during the regeneration.

To admit a suitable amount of the high temperature steam to the reactor on regeneration the throttle valve 5 is open to a certain extent. Using a slide valve, the flow through the valve depends on the opening area formed by an orifice in a movable plate. Adjustable stops are provided in the valve to permit the orifice opening to vary within the desired range and at the same time to keep the valve from becoming fully closed, e.g. from a minimum of 30 to 75 sq. in. to a maximum of 120 to 195 sq. in. In general, the amount of high temperature steam diverted from the main high temperautre steam line to the reactor or regeneration is of the order of .1 to .4 of the total high temperature steam continuously flowing to a pair of reactors; the major portion of the high temperature steam being sent to the reactor on-oil.

Using high pressure steam of 1400° F. and 40 p.s.i.g. out of a total of 121.9 volumes of this steam used for a pair of the reactors 27.8 parts is mixed with 5.3 parts of preheated air at 15 p.s.i.g. and 1100° F. to form a gaseous regeneration mixture having a temperature in the range of 1175° F. to 1350° F. and a pressure of 14 to 6 p.s.i.g. As this air-steam mixture passes through the catalyst it undergoes a pressure drop and it becomes mixed with products of combustion. The gas leaving the reactor on regeneration, then has a pressure of 6 to 8 p.s.i.g. and a temperature in the range of 1100° to 1300° F. Thus, the pressure in the reactor undergoing regeneration is maintained close to the pressure in the reactor on-oil. The difference in pressure for the two reactors can be kept within a range of 0 to 10 p.s.i. so that when the regeneration is completed and the air is cut off to allow for a short purge of air through the regeneration waste gas header the pressure in the reactor does not change substantially and the reactor is ready to be put on steam for reaction without any depressuring, which is time consuming.

The regeneration gas products are cooled to about 500° F. by being passed through a waste heat boiler in which steam is generated.

What is claimed is:

1. In a process of operating reaction zones, containing catalyst beds, each periodically and alternately on-stream for reaction of an organic reactant vapor diluted by steam then on-stream for catalyst regeneration during a cycle of operation, the improvement which comprises dividing a constant flow stream of steam superheated to above temperatures of the catalyst into branched streams passing into each of said zones, throttling a branched stream of the superheated steam passing into a catalyst bed undergoing regeneration to a lower flow rate than a flow rate of the superheated steam passing into a zone on-stream for reaction so that pressure in the zone containing the catalyst undergoing regeneration is prevented from rising substantially above the pressure in a zone on-stream for reaction, purging regeneration gases from the regenerated catalyst at substantially the same pressure used in regeneration, then placing the purged regenerated catalyst-containing zone on-stream for reaction by admitting thereto a stream of organic reactant vapor with increased flow of the superheated steam, thereby increasing the productive capacity of said zones by eliminating depressuring in changing from regeneration to on-stream for reaction, reducing the time of said cycle and maintaining said catalyst at a higher activity level.

2. In the process of claim 1, said throttling being accomplished by making the superheated steam pass through a decreased orifice area compared to the orifice area to which the superheated steam is passed to the zone on-stream for reaction.

3. In a process of operating a catalytic dehydrogenation zone periodically on-stream for reaction of butene vapor diluted by steam then on-stream for regeneration during the cycle of operation, the improvement which comprises dividing a constant flow stream of steam superheated to a temperature in the range of 1200° to 1600° F. into branched streams, throttling one of said branched streams of superheated steam through an adjusted variable orifice as it is passed to the zone containing catalyst bed undergoing regeneration, admixing air with the superheated steam passed through the catalyst bed undergoing regeneration, maintaining pressures in the range of 14 to 6 p.s.i.g. in gases passing through the catalyst bed undergoing regeneration, purging regeneration gases from the regenerated catalyst by a flow of steam therethrough at a pressure of 14 to 6 p.s.i.g., then putting the purged regenerated catalyst-containing zone on-stream for reaction by admitting thereto a stream of butene vapor with an increased flow of the superheated steam to maintain in said zone on-stream for reaction pressures in the range of 14 to 6 p.s.i.g., thereby eliminating depressuring in changing from the regeneration to the on-stream for reaction parts of the cycles.

4. In a process of operating a pair of reaction zones, each containing a catalyst bed, one zone being on-stream for reaction while the catalyst in the other is being regenerated to remove carbon deposited during reaction, the improvement which comprises dividing a constant-flow stream of steam superheated to a temperature of 1200° to 1400° F. into two branched streams of steam passing continuously into each of the zones, throttling the branched stream of superheated steam passed into the zone containing the catalyst undergoing regeneration to a flow rate which is .1 to .4 that of the constant-flow stream so that a major proportion of the superheated steam flows into the other zone on-stream for reaction, maintaining continuously a pressure in the range of 14 to 6 p.s.i.g. in the reaction zone containing catalyst undergoing regeneration followed by purging of regeneration gases, then putting the zone containing the regenerated catalyst on-stream for reaction at said continuously maintained pressures by admitting thereto a stream of heated butene vapor with an increased flow of said superheated steam.

5. In the process defined in claim 4, admitting air with the throttled superheated steam flowing into the zone containing the catalyst undergoing regeneration, then purging of regeneration gases by shutting off said air and passing the live steam with the throttled superheated steam into said zone.

References Cited in the file of this patent

UNITED STATES PATENTS

| 2,333,905 | Watson | Nov. 9, 1943 |
| 2,339,846 | Eastman et al. | Jan. 25, 1944 |
| 2,442,320 | Britton et al. | May 25, 1948 |
| 2,491,303 | Eastman | Dec. 13, 1949 |
| 2,509,900 | Wormith | May 30, 1950 |